US012092901B2

(12) United States Patent
Cheng

(10) Patent No.: US 12,092,901 B2
(45) Date of Patent: Sep. 17, 2024

(54) EYEGLASSES ASSEMBLY STRUCTURE

(71) Applicant: EAKAU INTERNATIONAL OPTICAL-ELECTRONIC CO., LTD., Douliu (TW)

(72) Inventor: Ju-Liang Cheng, Douliu (TW)

(73) Assignee: Eakau International Optical-Electronic Co., Ltd., Douliu (TW)

( * ) Notice: Subject to any disclaimer, the term of this patent is extended or adjusted under 35 U.S.C. 154(b) by 484 days.

(21) Appl. No.: 17/455,750

(22) Filed: Nov. 19, 2021

(65) Prior Publication Data
US 2022/0236588 A1    Jul. 28, 2022

(30) Foreign Application Priority Data
Jan. 28, 2021 (TW) ................................. 110103303

(51) Int. Cl.
*G02C 5/22* (2006.01)
(52) U.S. Cl.
CPC ..................................... *G02C 5/22* (2013.01)

(58) Field of Classification Search
CPC ...... G02C 5/22; G02C 2200/12; G02C 5/146; G02C 2200/18; G02C 5/2209
See application file for complete search history.

(56) References Cited

U.S. PATENT DOCUMENTS

| 9,454,017 B2 * | 9/2016 | Chen .................... G02C 5/22 |
| 10,247,959 B2 * | 4/2019 | Berthoud ............ G02C 5/2209 |
| 10,690,937 B1 * | 6/2020 | Law ..................... G02C 5/22 |

FOREIGN PATENT DOCUMENTS

KR          1518133 B1 *  5/2015

* cited by examiner

Primary Examiner — Tuyen Tra
(74) Attorney, Agent, or Firm — Rosenberg, Klein & Lee

(57) ABSTRACT

An eyeglasses assembly structure is revealed. A pivot member which is pivotally connected to a first assembly portion of a frame is inserted and mounted in a switch member. A first rib and a second rib are opposite to each other and disposed on a second assembly portion at a front side of a temple. The first rib is mounted into a first mounting groove at one end of the pivot member. A positioning flange is formed on the second rib and inserted through an opening of the switch member to be mounted in a second mounting groove on the other end of the pivot member. When the switch member is rotated an angle to be staggered or aligned with respect to the positioning flange of the second rib, the temple is firmly fixed to or separated from the frame. Thereby parts are assembled and replaced easily and conveniently.

10 Claims, 17 Drawing Sheets

EYEGLASSES ASSEMBLY STRUCTURE

BACKGROUND OF THE INVENTION

Field of the Invention

The present invention relates to an eyeglasses assembly structure, especially to an eyeglasses assembly structure in which temples are fixed to a frame firmly and worn parts are easy to be replaced by arrangement of a rotatable switch member.

Description of Related Art

As shown in FIG. 17, a screwless eyeglasses assembly structure in which a frame and temples are connected without screws. An assembly portion 61 is formed on a lateral side of a frame 6 and provided with an upper and a lower tenons 62 while a mortise 71 is formed on both an upper end and a lower end of a pivot member 7. The tenons 62 of the assembly portion 61 fit into the mortises 71 of the pivot member 7 correspondingly. A connection member 8 is provided and composed of a front end pivotally connected to the pivot member 7 and a rear end locked and connected with a fastening hole 91 disposed on a temple 9.

Although the above screwless eyeglasses assembly structure not only solves the problem of easy-loosening of the screws of the conventional eyeglasses assembly structure over time but also has exquisite appearance, the screwless eyeglasses assembly structure still has shortcomings of high manufacturing cost caused by complicated structure and difficulty in disassembly. After being used for a period of time, wear and tear occur due to multiple times of folding and unfolding of the frame and the temple and replacement of the parts is required. The eyeglasses assembly structure available now is difficult to disassemble so that users usually throw away the whole eyeglasses instead of displacement of worn parts. This leads to a waste of materials and resources.

SUMMARY OF THE INVENTION

Therefore, it is a primary object of the present invention to provide an eyeglasses assembly structure in which a temple and a frame are connected firmly and worn parts are easy to be replaced by arrangement of a rotatable switch member.

In order to achieve the object, an eyeglasses assembly structure according to the present invention includes a pivot member not only pivotally connected to a first assembly portion of a frame but also inserted and mounted in a switch member. A first rib and a second rib are opposite to each other and arranged at a second assembly portion on a front side of a temple. The first rib is mounted into a first mounting groove at one end of the pivot member. A positioning flange is formed on the second rib and inserted through an opening of the switch member to be mounted in a second mounting groove on the other end of the pivot member. When the switch member is rotated an angle to be staggered with respect to the positioning flange of the second rib, the temple is securely connected to the frame, unable to be released from the frame. In order to replace parts, the temple and the frame are separated from each other by rotating the opening of the switch member to be aligned with the positioning flange of the second rib. Thereby the parts can be easily replaced assembled.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENT

Figure 1:
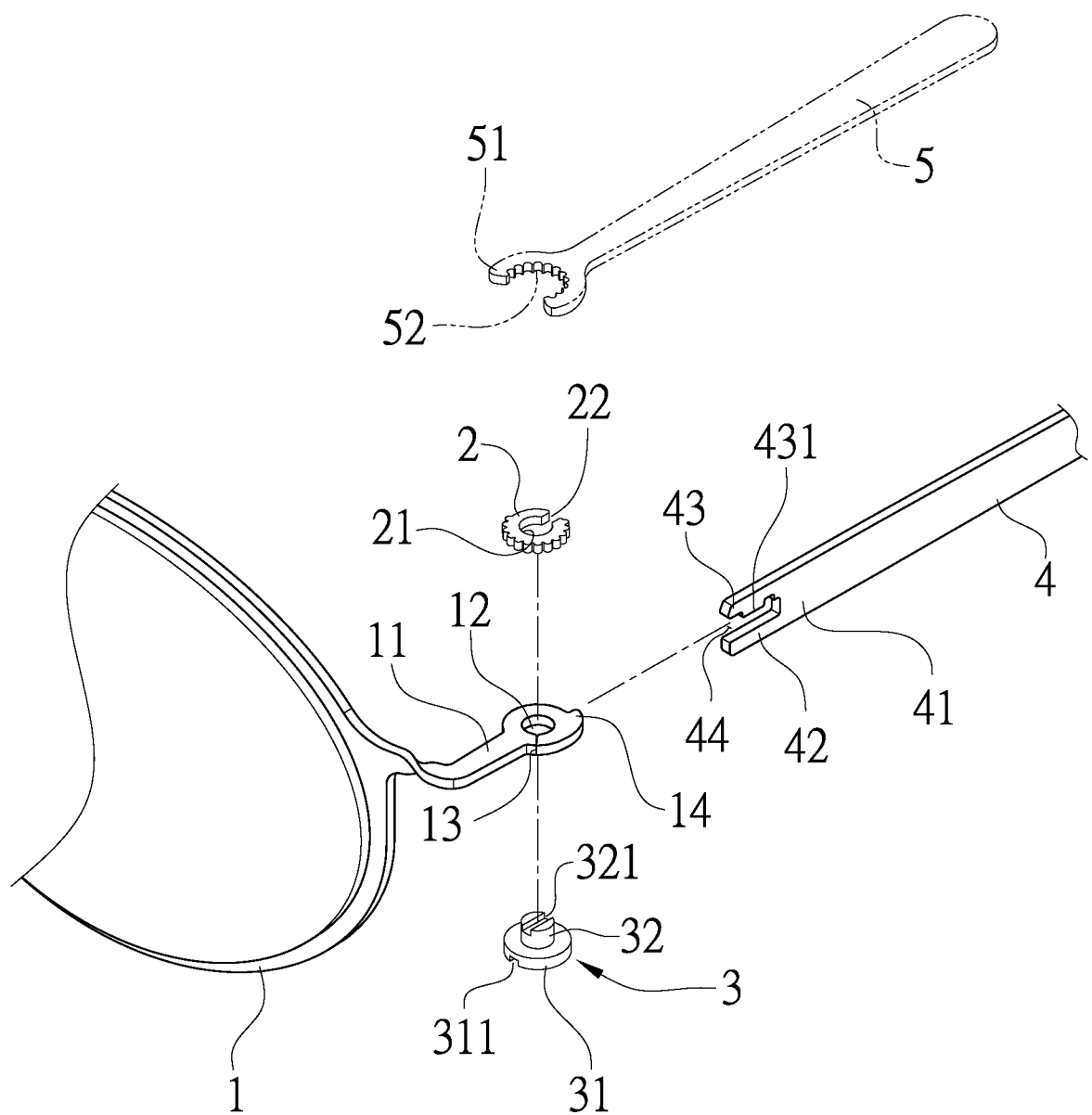
FIG. 1 is an exploded view of an embodiment according to the present invention.

As shown in FIG. 1, an eyeglasses assembly structure mainly includes a frame 1, a switch member 2, a pivot member 3, and a temple 4.

The frame 1 consists of a first assembly portion 11 formed on a lateral side thereof, a pivot hole 12 arranged at the first assembly portion 11, a groove 13 mounted on one side of the first assembly portion 11, extending to and communicating with the pivot hole 12, and a limit flange 14 disposed on one side of the first assembly portion 11 and located behind the groove 13.

The switch member 2 which is a toothed disc is disposed on a top surface of the first assembly portion 11 of the frame 1 and composed of a through hole 21 and an opening 22. The through hole 21 is corresponding to the pivot hole 12 on the first assembly portion 11 while the opening 22 is located on one side of the switch member 2 and communicating with the through hole 21.

The pivot member 3 is provided with a stopping block 31 and a pivot 32 connected to the stopping block 3. The pivot 32 is inserted through and pivotally connected to the pivot hole 12 on the first assembly portion 11 of the frame 1 and the through hole 21 of the switch member 2 while the stopping block 31 is abutting against and positioned by a bottom surface of the first assembly portion 11. A surface of one end of the stopping block 31 and a surface of one end of the pivot 32 which are opposite to each other are respectively provided with a first mounting groove 311 and a second mounting groove 321.

The temple 4 is composed of a second assembly portion 41 formed on a front side thereof, a first rib 42, a second rib 43, and a gap 44 formed between the first rib 42 and the second rib 43. The first rib 42 and the second rib 43 are opposite to each other and disposed on the second assembly portion 41. A positioning flange 431 is formed on the second rib 43 and facing the gap 44. The first rib 42 is mounted into the first mounting groove 311 of the stopping block 31 of the pivot member 3 while the positioning flange 431 of the second rib 43 is inserted through the opening 22 of the switch member 2 to be mounted in the second mounting groove 321 of the pivot 32 of the pivot member 3. The switch member 2 is able to be moved and rotated so that the opening 22 thereof and the positioning flange 431 of the second rib 43 are staggered or aligned with respect to each other. Moreover, a lateral surface of the second assembly portion 41 of the temple 4 and the limit flange 14 on the side of the first assembly portion 11 are abutting against and limited by each other.

The present eyeglasses assembly structure further includes a wrench 5 which consists of two jaws 51 opposite to each other and a recess 52 defined between the two jaws 51. A shape of the recess 52 is corresponding to the switch member 2 so that the switch member 2 is held in the recess 52 of the wrench 5 by the jaws 51.

Figure 2:
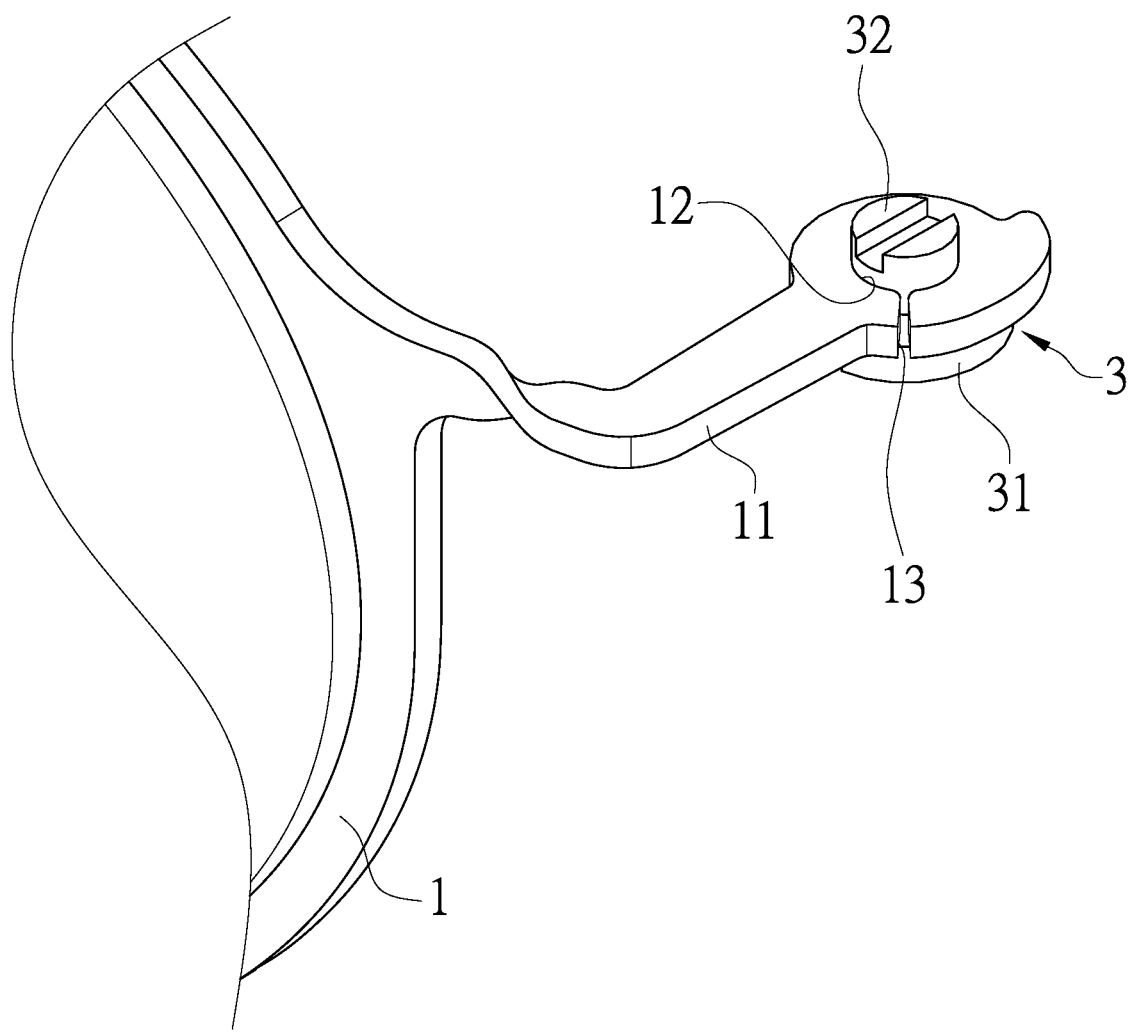
FIG. 2 is a schematic drawing showing assembling of an embodiment according to the present invention.
Figure 3:
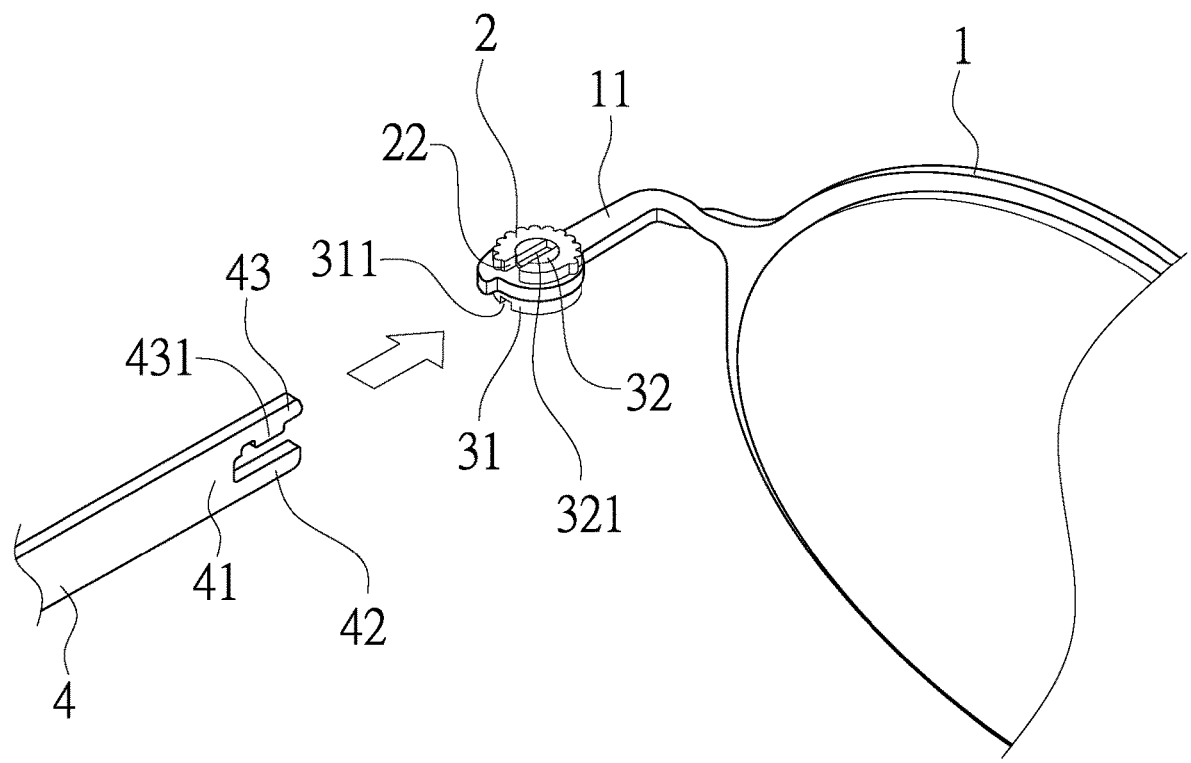
FIG. 3 is another schematic drawing showing assembling of an embodiment according to the present invention.

While in use, as shown in FIG. 2, the pivot 32 of the pivot member 3 is inserted through and pivotally connected to the pivot hole 12 on the first assembly portion 11 of the frame 1. The pivot hole 12 can be extended or reduced elastically due to the groove 13 disposed on one side of the pivot hole 12 of the first assembly portion 11 so that the pivot 32 is inserted through the pivot hole 12 smoothly and held firmly in the pivot hole 12. The stopping block 31 of the pivot member 3 and the bottom surface of the first assembly portion 11 are abutting against and positioned by each other. Also refer to FIG. 3, then the switch member 2 is disposed on the top surface of the first assembly portion 11 and the pivot 32 of the pivot member 3 is inserted through the through hole 21 of the switch member 2. The opening 22 of the switch member 2 is aligned with the second mounting groove 321 of the pivot 32 of the pivot member 3. Next the first rib 42 of the second assembly portion 41 of the temple 4 is mounted into the first mounting groove 311 on a bottom surface of the stopping block 31 of the pivot member 3 while the positioning flange 431 of the second rib 43 is inserted through the opening 22 of the switch member 2 and mounted in the second mounting groove 321 on a top surface of the pivot 32 of the pivot member 3.

Figure 4:
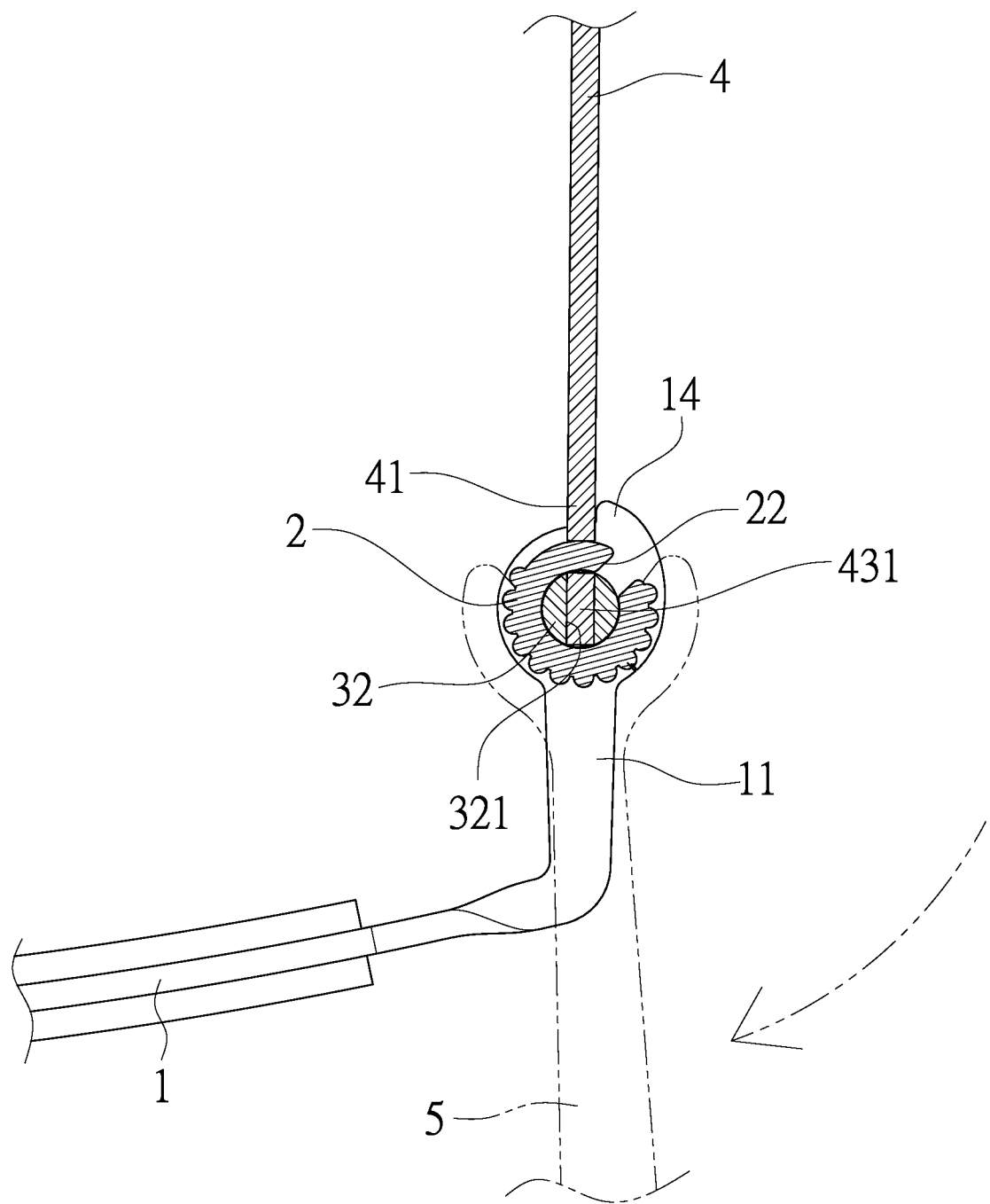
FIG. 4 is a schematic drawing showing an opening of a switch member and a positioning flange of a temple staggered with respect to each other of an embodiment according to the present invention.
Figure 5:
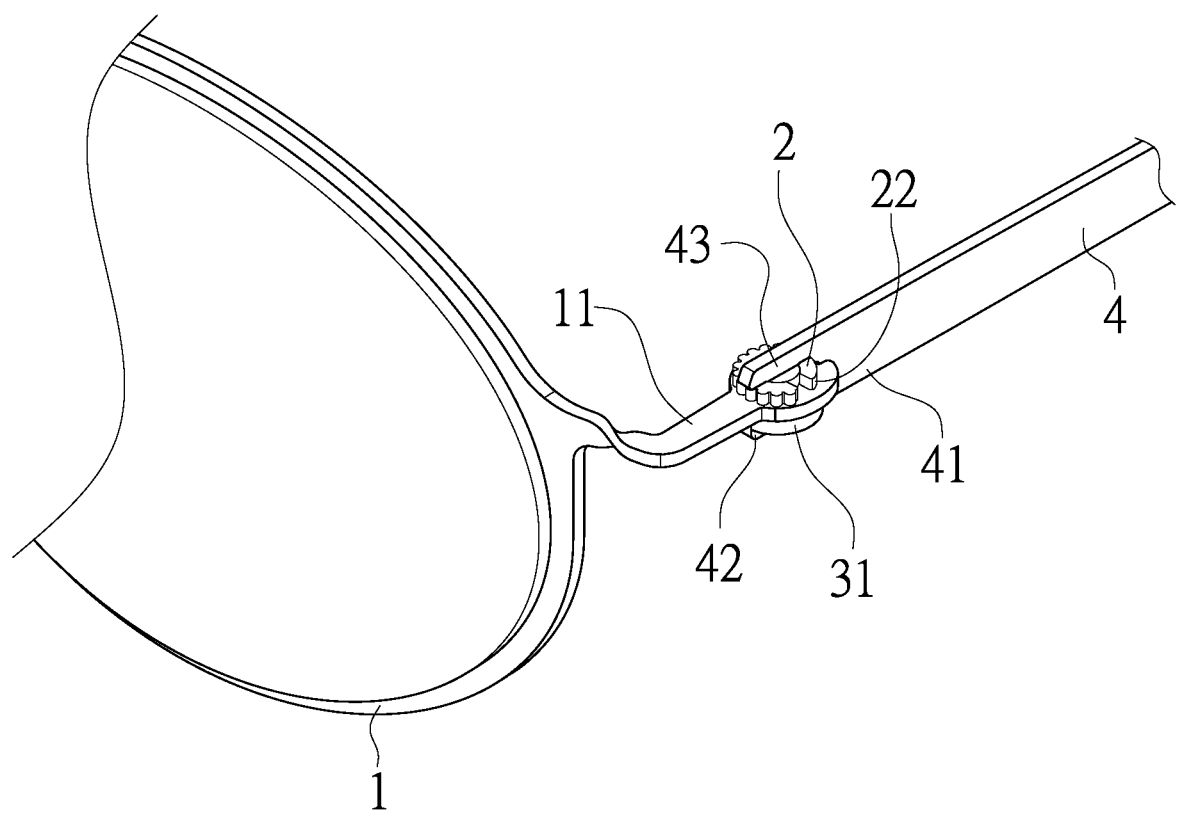
FIG. 5 is a perspective view of an assembled embodiment according to the present invention.

Also refer to FIG. 4, the switch member 2 is held in the recess 52 of the wrench 5 by the jaws 51 so that the switch member 2 is rotated an angle by the wrench 5. Thus the opening 22 of the switch member 2 and the positioning flange 431 of the second rib 43 of the temple 4 are staggered with respect to each other. And the positioning flange 431 of the second rib 43 of the temple 4 is locked in the through hole 21 of the switch member 2, unable to be released. Thereby the present eyeglasses assembly structure has been completed easily and conveniently and the temple 4 is pivotally connected to the frame 1 firmly (as shown in FIG. 5). A lateral surface of the second assembly portion 41 of the temple 4 and the limit flange 14 on one side of the first assembly portion 11 are abutting against and limited by each other when the temple 4 of the present eyeglasses assembly structure is unfolded. Thus the unfolded temple 4 at the optimal angle is provided. Owing to the pivot hole 12 able to be extended or reduced elastically, the tightness with which the pivotally connected temple 4 is folded and unfolded is maintained at the adequate levels. Therefore, not only hard folding and unfolding of the temple 4 caused by over-tightness, unexpected folding and unfolding of the temple 4 caused by loose connection can also be avoided.

Figure 6:
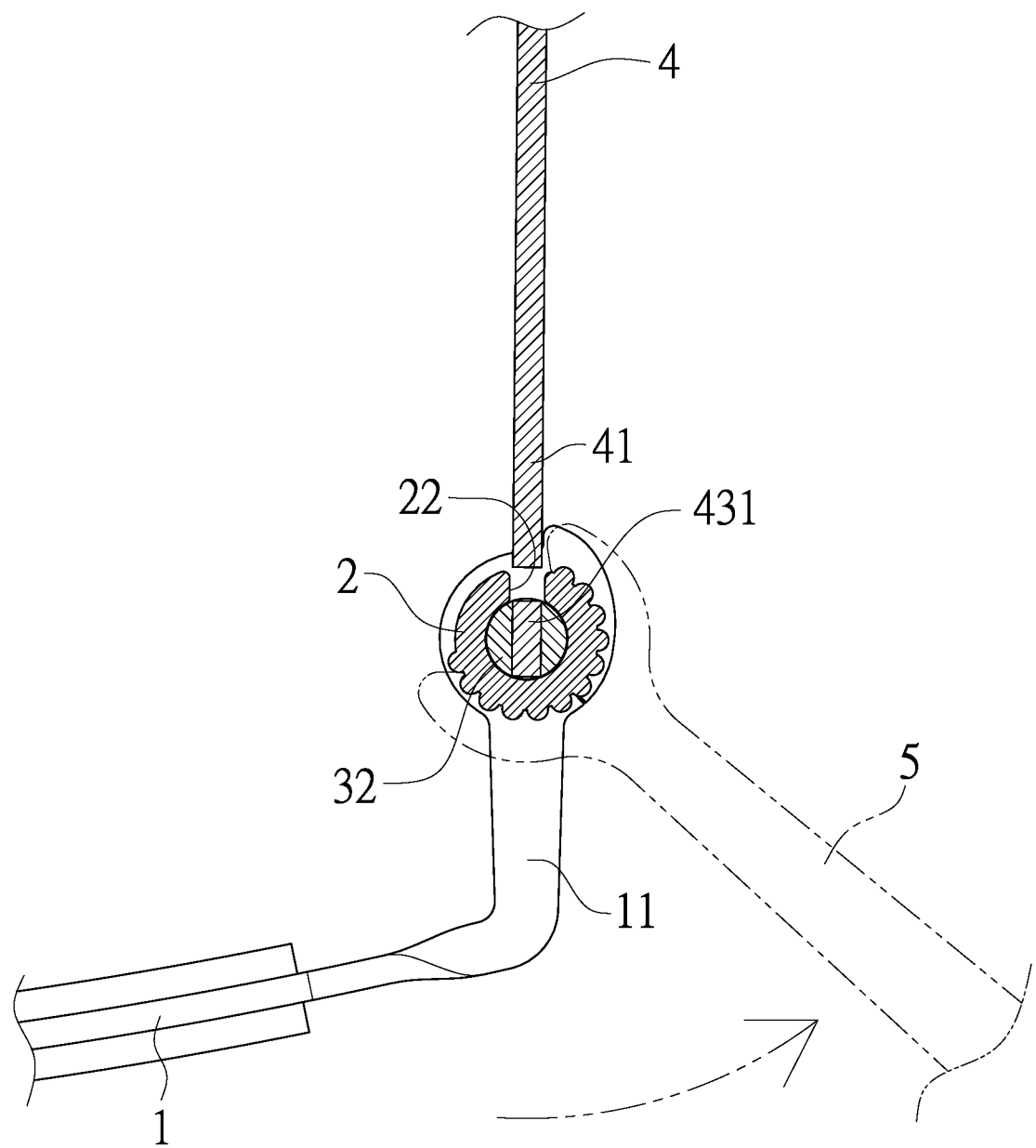
FIG. 6 is a schematic drawing showing an opening of a switch member and a positioning flange of a temple aligned with each other of an embodiment according to the present invention.
Figure 7:
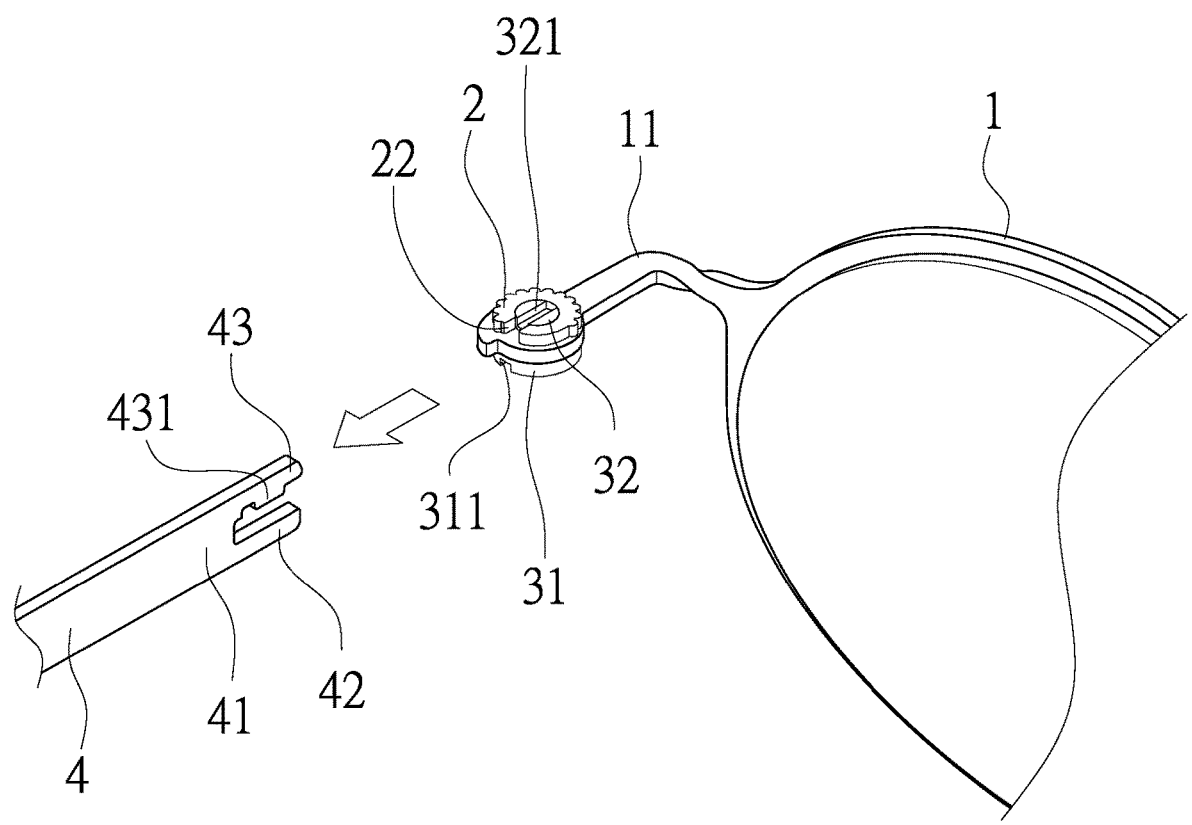
FIG. 7 is a schematic drawing showing disassembling of an embodiment according to the present invention.

Wear and tear occur due to multiple times of folding and unfolding of the temple 4 and the frame 1 after wearing the present eyeglasses assembly for a period of time so that replacement of parts is required. Refer FIG. 6, the user uses the wrench 5 to hold the switch member 2 in the recess 52 by the jaws 51 again and then rotate the switch member 2 until the opening 22 of the switch member 2 is aligned with the positioning flange 431 of the second rib 43 on the second assembly portion 41. Also refer to FIG. 7, a force is applied to remove the positioning flange 431 of the second rib 43 on the second assembly portion 41 from the second mounting groove 321 on the top surface of the pivot 32 of the pivot member 3 to be released from the opening 22 of the switch member 2. At the same time, the first rib 42 of the second assembly portion 41 is also pulled out of the first mounting groove 311 on the bottom of the stopping block 31 of the pivot member 3. Thereby the frame 1, the switch member 2, the pivot member 3, and the temple 4 are disassembled easily and conveniently for replacement of worn parts. There is no need to throw away the whole eyeglasses assembly structure and the waste of materials and resources is reduced.

Figure 8:
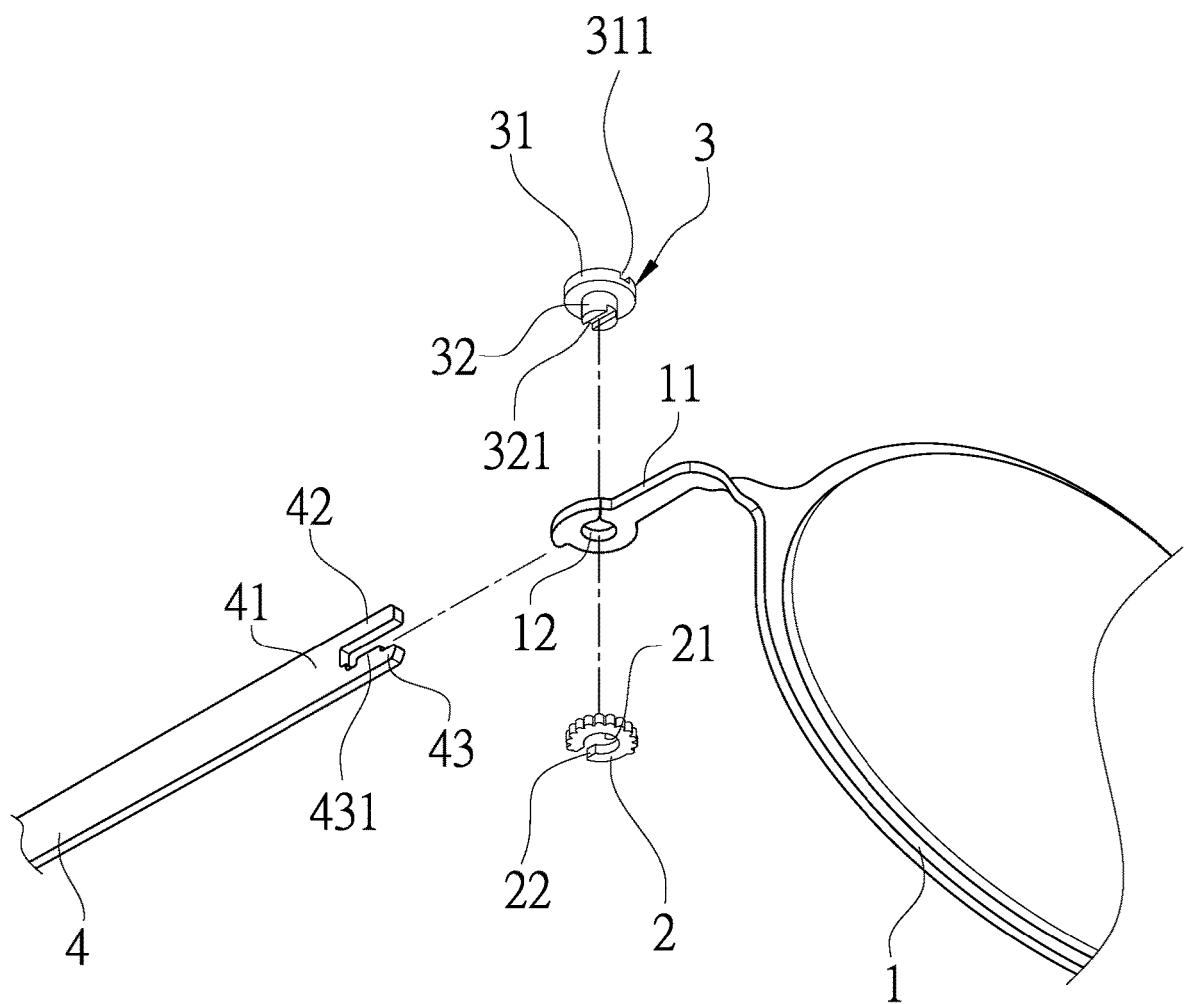
FIG. 8 is an exploded view of another embodiment according to the present invention.
Figure 9:
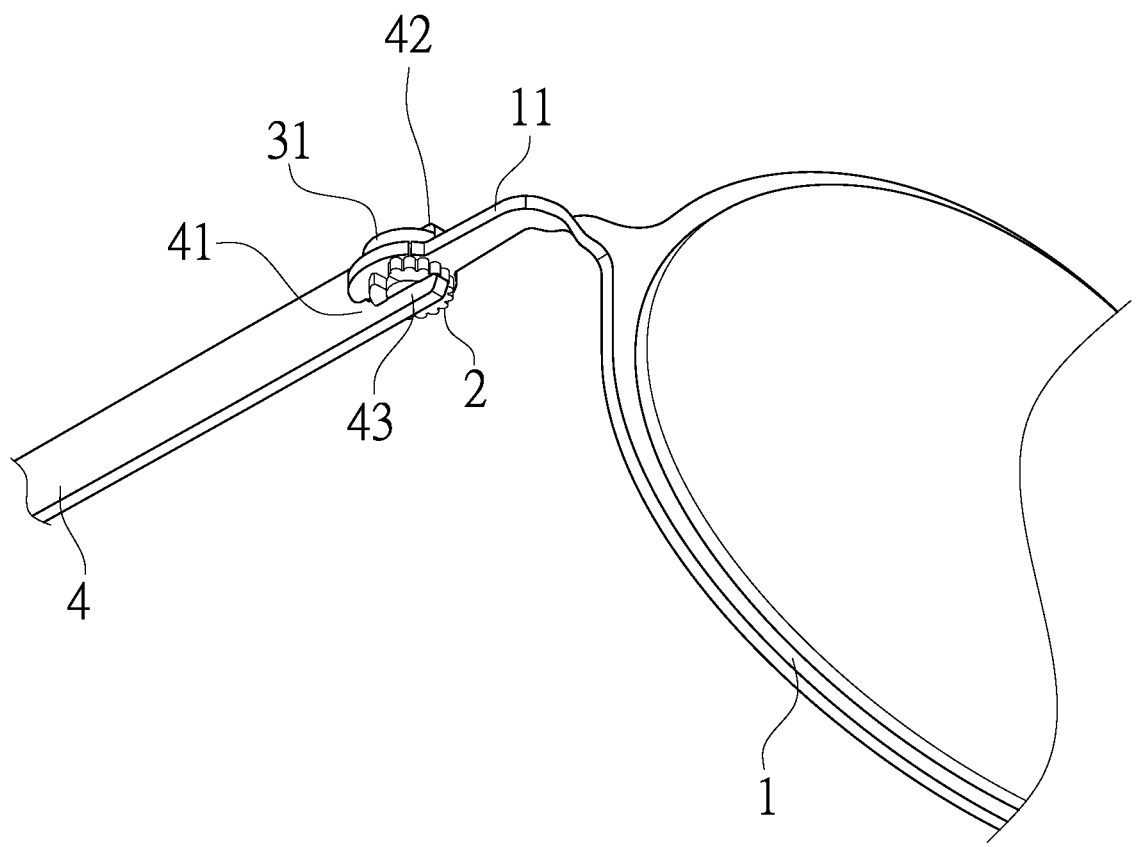
FIG. 9 is a perspective view of another embodiment according to the present invention.

Refer to FIG. 8 and FIG. 9, another embodiment is revealed. In this embodiment, the positions of the switch member 2 and the pivot member 3 are mutually switched. The switch member 2 is arranged at a bottom surface of the first assembly portion 11 of the frame 1 while the pivot 32 of the pivot member 3 is inserted through the pivot hole 12 of the first assembly portion 11 and then the stopping block 31 is abutting against and positioned by a top surface of the first assembly portion 11. The first rib 42 and the second rib 43 on the second assembly portion 41 of the temple 4 are also interchanged. Thereby the first rib 42 of the second assembly portion 41 is mounted in the first mounting groove 311 of the stopping block 31 of the pivot member 3. The positioning flange 431 of the second rib 43 on the second assembly portion 41 is inserted through the opening 22 of the switch member 2 to be mounted in the second mounting groove 321 of the pivot 32 of the pivot member 3. Thereby the temple 4 is able to be firmly fixed to or removed from the frame 1 easily and conveniently.

Figure 10:
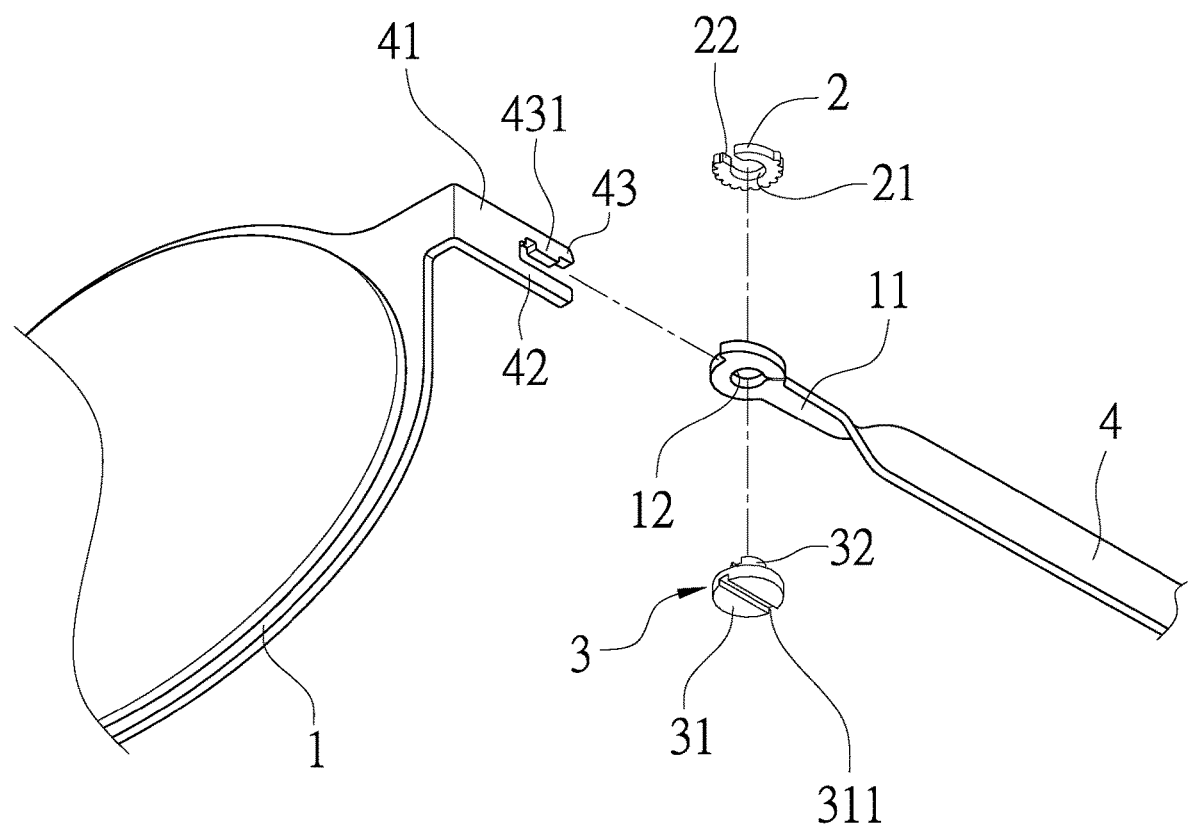
FIG. 10 is an exploded view of a further embodiment according to the present invention.
Figure 11:
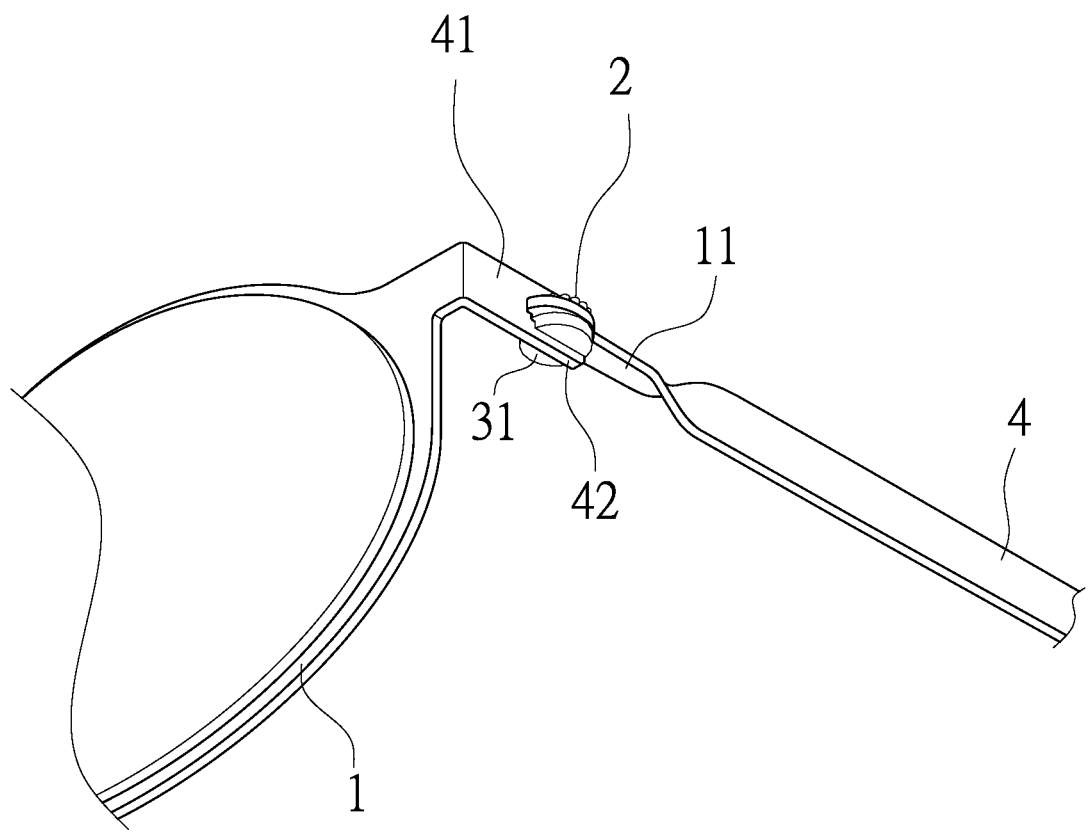
FIG. 11 is a perspective view of further embodiment according to the present invention.

Refer to FIG. 10 and FIG. 11, a further embodiment is disclosed. In this embodiment, the first assembly portion 11 of the frame 1 and the second assembly portion 41 of the temple 4 are interchanged so that the first assembly portion 11 is formed on a front side of the temple 4 and the second assembly portion 41 is formed on a lateral side of the frame 1. Thereby the pivot 32 of the pivot member 3 is inserted through and pivotally connected to the pivot hole 12 of the first assembly portion 11 and the through hole 21 of the switch member 2 for pivot connection of the pivot member 3 with the first assembly portion 11 and the switch member 2 after the switch member 2 arranged at a top surface of the first assembly portion 11 of the temple 4. And the stopping block 31 of the pivot member 3 is abutting against and positioned by a bottom surface of the first assembly portion 11. Then the first rib 42 on the second assembly portion 41 of the frame 1 is mounted in the first mounting groove 311 disposed on the bottom of the stopping block 31 of the pivot member 3 while the positioning flange 431 of the second rib 43 on the second assembly portion 41 is inserted through the opening 22 of the switch member 2 to be mounted and positioned in the second mounting groove 321 on a top surface of the pivot 32 of the pivot member 3.

Figure 12:
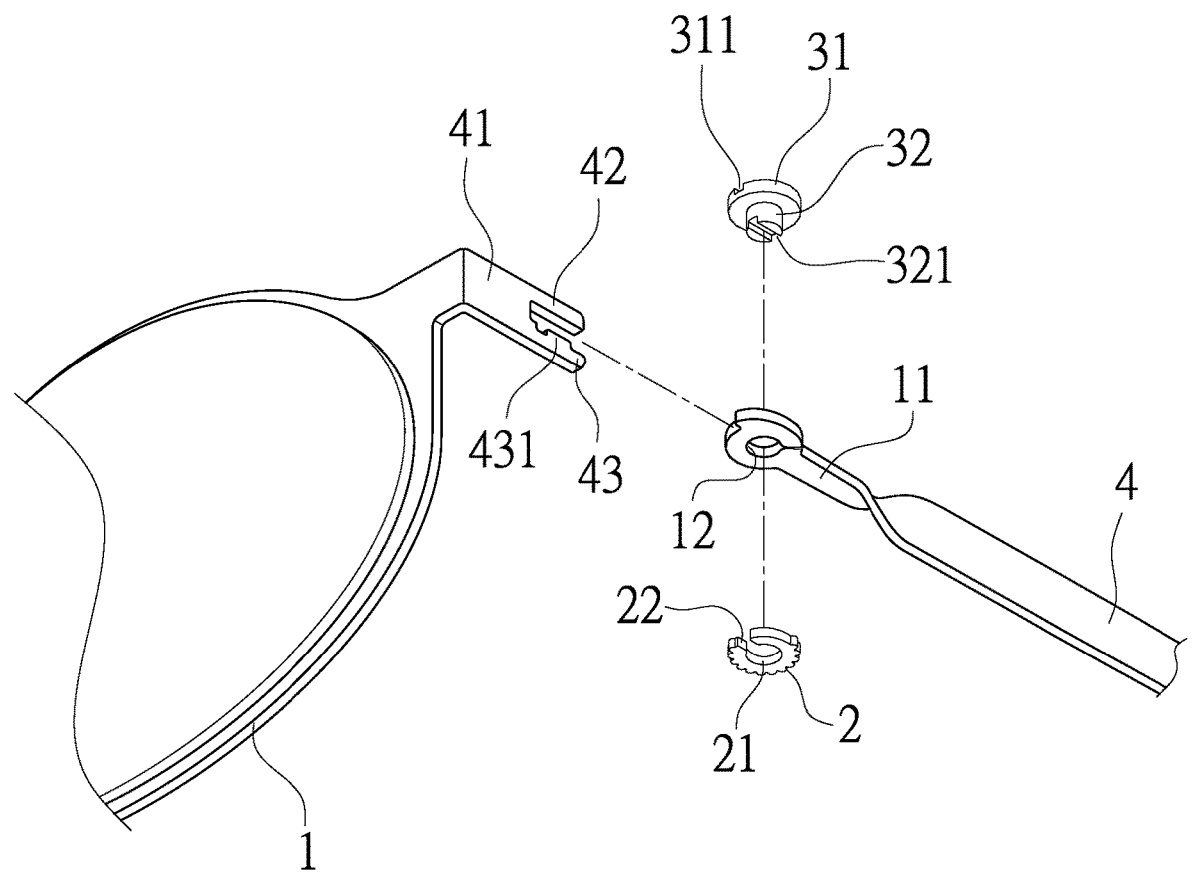
FIG. 12 is an exploded view of a further embodiment according to the present invention.
Figure 13:
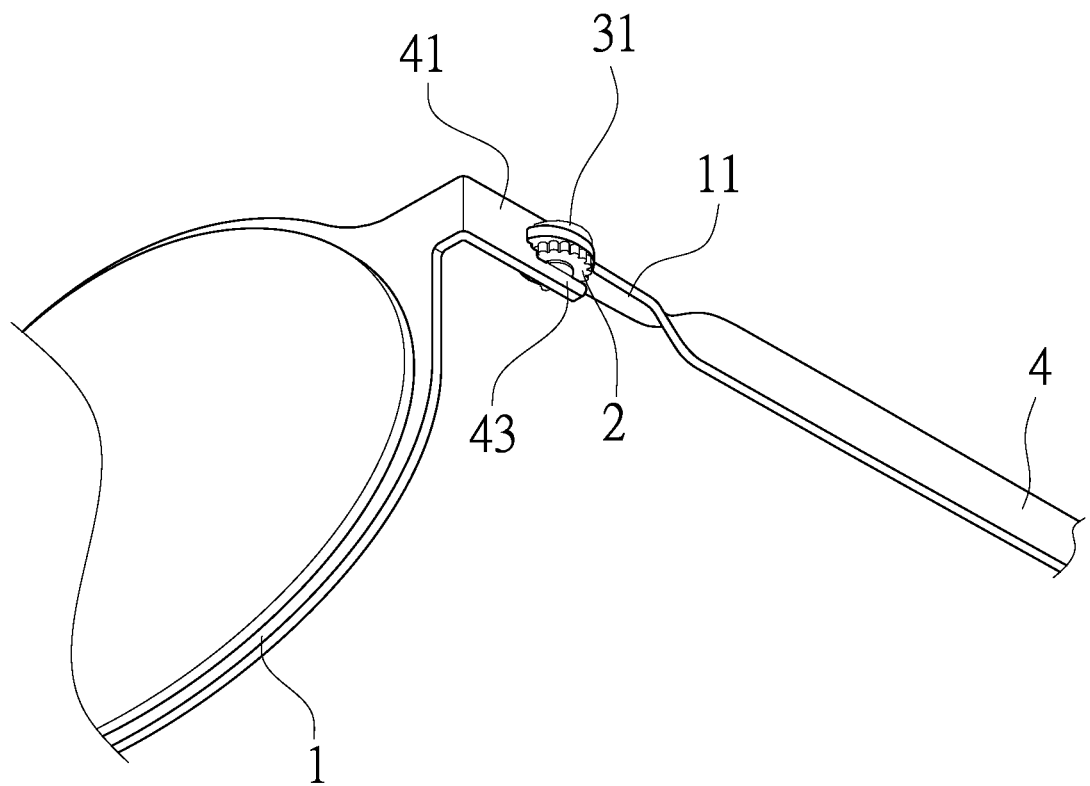
FIG. 13 is a perspective view of further embodiment according to the present invention.

Refer to FIG. 12 and FIG. 13, a further embodiment is disclosed. In this embodiment, the switch member 2 and the pivot member 3 of the above embodiment are interchanged and then assembled. Thus the switch member 2 is disposed on a bottom surface of the first assembly portion 11 of the frame 1 while the pivot 32 of the pivot member 3 is inserted through the pivot hole 12 of the first assembly portion 11 and then the stopping block 31 is abutting against and positioned by a top surface of the first assembly portion 11. Moreover, the first rib 42 and the second rib 43 on the second assembly portion 41 of the frame 1 are also interchanged. Thus the first rib 42 on the second assembly portion 41 is mounted in the first mounting groove 311 of the stopping block 31 of the pivot member 3 while the positioning flange 431 of the second rib 43 on the second assembly portion 41 is inserted through the opening 22 of the switch member 2 to be mounted in the second mounting groove 321 of the pivot 32 of the pivot member 3.

Figure 14:
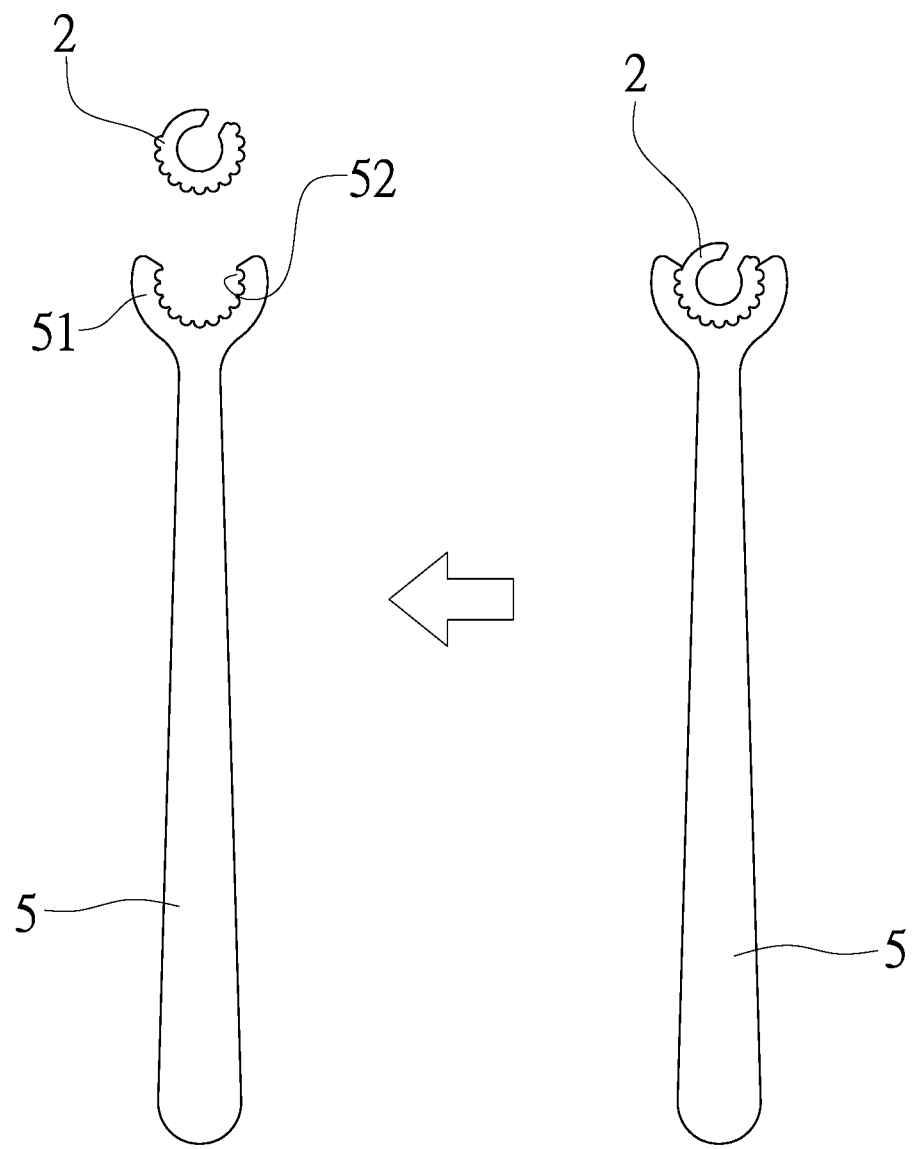
FIG. 14 is a schematic drawing showing cutting of a wrench from a switch member of an embodiment according to the present invention.
Figure 15:
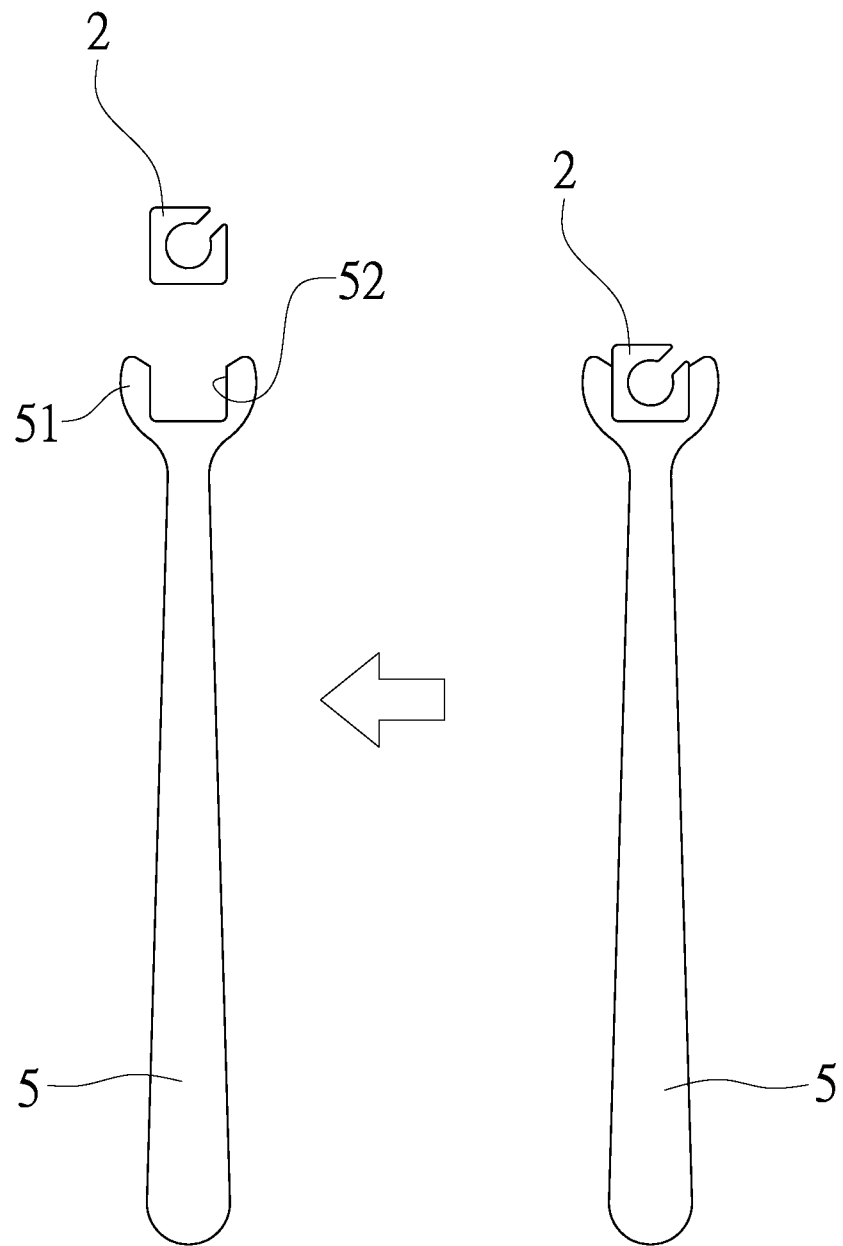
FIG. 15 is another schematic drawing showing cutting of a wrench from a switch member of an embodiment according to the present invention.
Figure 16:
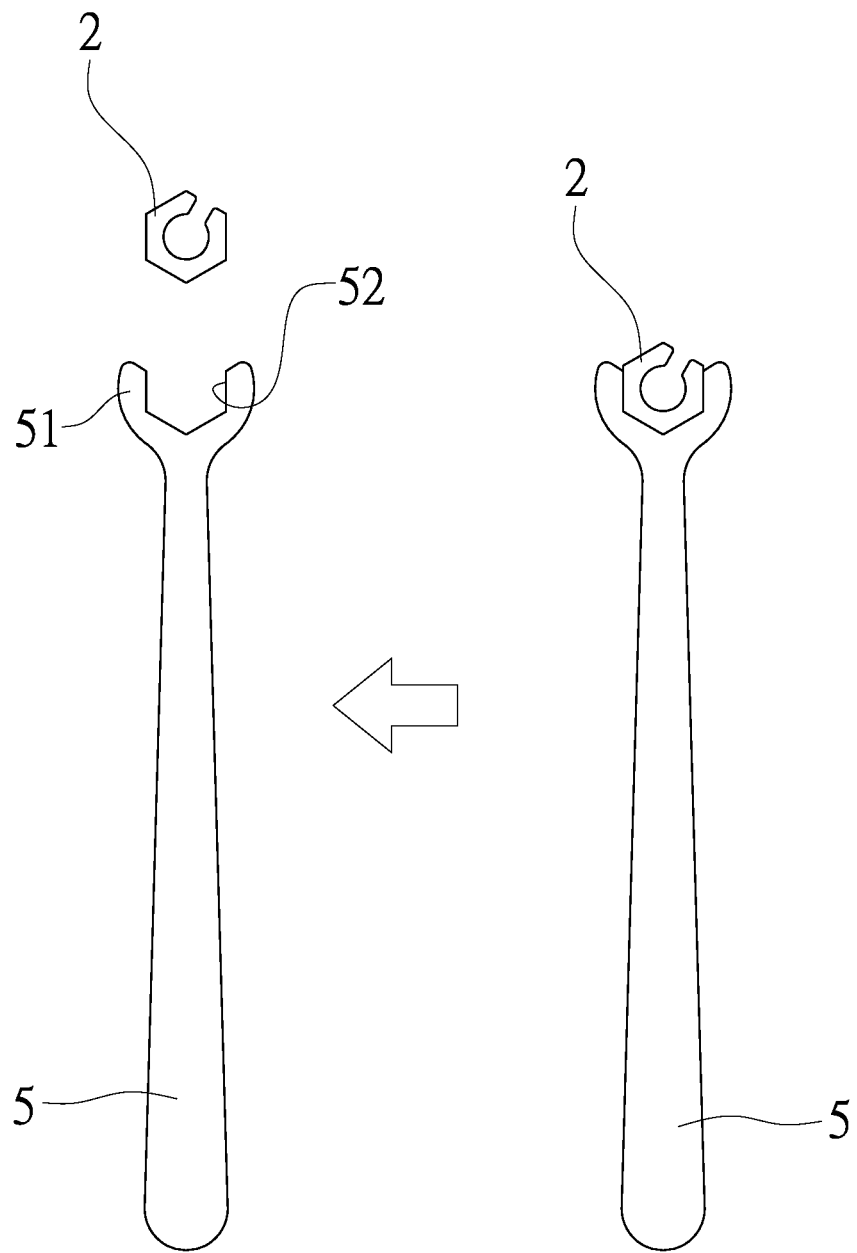
FIG. 16 is a further schematic drawing showing cutting of a wrench from a switch member of an embodiment according to the present invention.
Figure 17:
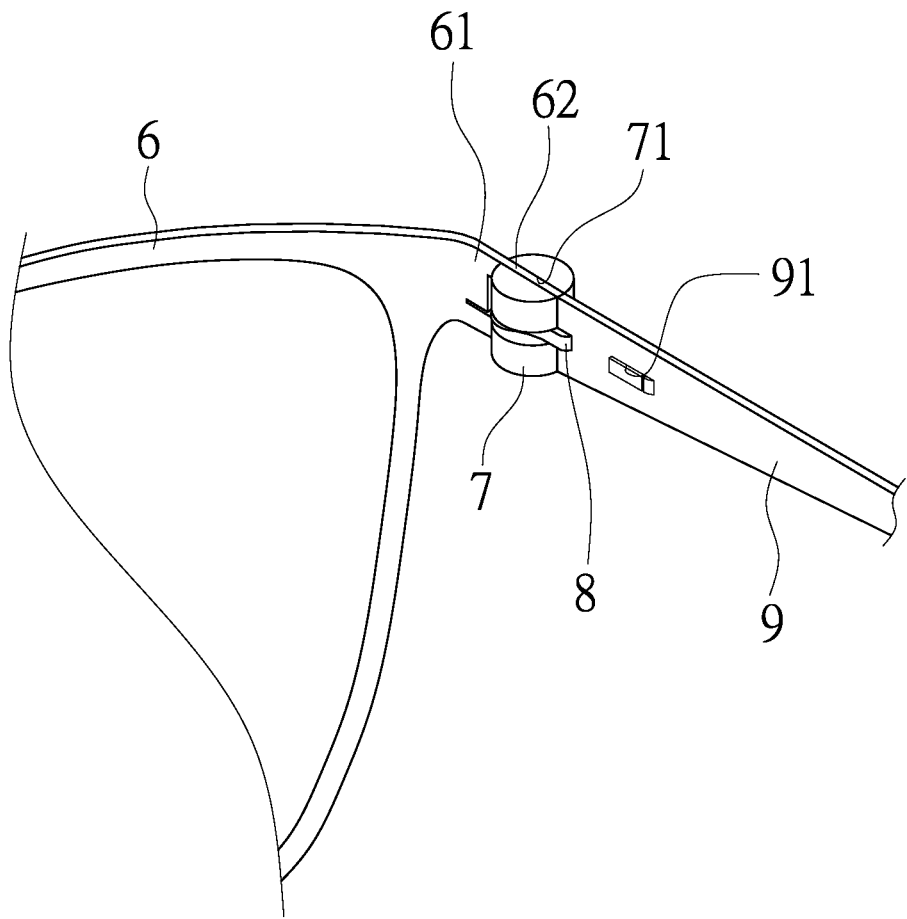
FIG. 17 is a perspective view of a prior art.

Refer to FIGS. 14-16, a switch member 2 is cut from a front end of a wrench 5 by various ways such as punching and cutting, wire cutting, etc. An area left after the switch member 2 being cut forms a recess 52 of the wrench 5. Thereby the manufacturing cost, materials and resources used are all reduced. A shape of the switch member 2 can be different geometric shapes such as a toothed disc (as shown in FIG. 14), a polygon such as a rectangle (as shown in FIG. 15) and a hexagon (as shown in FIG. 16), an oval, etc. while a circle is not included.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalent.

What is claimed is:

1. An eyeglasses assembly structure comprising a frame, a temple, a switch member, and a pivot member while each of the frame and the temple is selectively provided with a first assembly portion or a second assembly portion;
   wherein a pivot hole is disposed on the first assembly portion;
   wherein a first rib and a second rib are opposite to each other and mounted on the second assembly portion while a gap is formed between the first rib and the second rib; a positioning flange is formed on the second rib and facing the gap;
   wherein the switch member is arranged at the first assembly portion and having a through hole and an opening which are respectively corresponding to the pivot hole of the first assembly portion and located on one side of the switch member while the opening is communicating with the through hole;
   wherein the pivot member is provided with a stopping block which is connected to a pivot; the pivot is inserted through and pivotally connected to the pivot hole of the first assembly portion and the through hole of the switch member while the stopping block and the first assembly portion are abutting against and positioned by each other; wherein a surface of one end of the stopping block and a surface of one end of the pivot which are located opposite to each other are respectively provided with a first mounting groove and a second mounting groove; wherein the first rib of the second assembly portion is mounted into the first mounting groove of the stopping block of the pivot member while the positioning flange of the second rib of the second assembly portion is inserted through the opening of the switch member to be mounted in the second mounting groove of the pivot of the pivot member; wherein the switch member is rotated so that the opening of the switch member and the positioning flange of the second rib are staggered or aligned with respect to each other.

2. The eyeglasses assembly structure as claimed in claim 1, wherein the first assembly portion is formed on a lateral side of the frame while the second assembly portion is formed on a front side of the temple.

3. The eyeglasses assembly structure as claimed in claim 1, wherein the first assembly portion is formed on a front side of the temple while the second assembly portion is formed on a lateral side of the frame.

4. The eyeglasses assembly structure as claimed in claim 1, wherein the first assembly portion is provided with a top surface and a bottom surface opposite to the top surface; the switch member is disposed on the top surface of the first assembly portion; the stopping block of the pivot member is abutting against and positioned by the bottom surface of the first assembly portion.

5. The eyeglasses assembly structure as claimed in claim 1, wherein the first assembly portion is provided with a top surface and a bottom surface opposite to the top surface; the switch member is disposed on the bottom surface of the first assembly portion; the stopping block of the pivot member is abutting against and positioned by the top surface of the first assembly portion.

6. The eyeglasses assembly structure as claimed in claim 1, wherein the switch member is in a shape selected from the group consisting of a toothed disc, a polygon, and an oval.

7. The eyeglasses assembly structure as claimed in claim 1, wherein a groove is mounted on one side of the first assembly portion and extending to and communicating with the pivot hole.

8. The eyeglasses assembly structure as claimed in claim 1, wherein a limit flange is disposed on one side of the first assembly portion and abutting against and limited by a lateral surface of the second assembly portion.

9. The eyeglasses assembly structure as claimed in claim 1, wherein the eyeglasses assembly structure further includes a wrench which includes two jaws opposite to each other and a recess defined between the two jaws; a shape of the recess is corresponding to a shape of the switch member.

10. The eyeglasses assembly structure as claimed in claim 9, wherein the switch member is separated from the wrench by cutting and an area left after the switch member being cut forms the recess of the wrench.

* * * * *